(12) United States Patent
Jin

(10) Patent No.: US 9,639,151 B2
(45) Date of Patent: May 2, 2017

(54) METHOD AND APPARATUS FOR PRESENTING AN OPTION

(75) Inventor: Sheng Jin, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 392 days.

(21) Appl. No.: 13/701,842

(22) PCT Filed: Jun. 1, 2011

(86) PCT No.: PCT/IB2011/052413
§ 371 (c)(1),
(2), (4) Date: Feb. 11, 2013

(87) PCT Pub. No.: WO2011/154873
PCT Pub. Date: Dec. 15, 2011

(65) Prior Publication Data
US 2013/0207888 A1    Aug. 15, 2013

(30) Foreign Application Priority Data

Jun. 10, 2010 (CN) .......................... 2010 1 0200702

(51) Int. Cl.
G06F 3/01 (2006.01)
G06F 3/042 (2006.01)

(52) U.S. Cl.
CPC .............. G06F 3/011 (2013.01); G06F 3/017 (2013.01); G06F 3/0425 (2013.01)

(58) Field of Classification Search
CPC ........ G06F 3/014; G06F 3/017; G06F 3/0386; G06F 3/0425; G06F 3/0325; G06F 3/0346; G06F 3/012; G06F 3/033; G06F 3/04842; G06F 17/24; G06F 3/013; G06F 3/0354; G06F 3/0482; G06F 3/038; G06F 3/0383; G06F 3/0481; G06F 3/04812; G06F 3/04817
See application file for complete search history.

(56) References Cited

U.S. PATENT DOCUMENTS

| | | | |
|---|---|---|---|
| 6,421,042 B1 * | 7/2002 | Omura | G06F 3/011 345/156 |
| 8,659,548 B2 | 2/2014 | Hildreth | |
| 2002/0146672 A1 | 10/2002 | Burdea et al. | |
| 2003/0076293 A1 | 4/2003 | Mattsson | |
| 2007/0060336 A1 * | 3/2007 | Marks | A63F 13/02 463/30 |

(Continued)

FOREIGN PATENT DOCUMENTS

| CN | 101133958 A | 3/2008 |
|---|---|---|
| CN | 101582006 A | 11/2009 |

(Continued)

OTHER PUBLICATIONS

Zhou et al., "A Survey—Human movement Tracking and Stroke Rehabilitation", Technical Report: to Essex University.

(Continued)

*Primary Examiner* — Grant Sitta
*Assistant Examiner* — Amen Bogale

(57) ABSTRACT

A method of presenting an option comprises: calculating a movement range of an object; calculating an area of a display device based on the movement range; and presenting at least one option in the area of the display device.

17 Claims, 3 Drawing Sheets

(56) References Cited

U.S. PATENT DOCUMENTS

| | | |
|---|---|---|
| 2008/0019589 A1 | 1/2008 | Yoon et al. |
| 2008/0052750 A1* | 2/2008 | Grunnet-Jepsen . H04N 7/17318 725/109 |
| 2008/0170123 A1 | 7/2008 | Albertson et al. |
| 2009/0027337 A1 | 1/2009 | Hildreth |
| 2009/0137369 A1 | 5/2009 | Branch et al. |
| 2010/0013812 A1* | 1/2010 | Gu .................. G06F 3/014 345/207 |
| 2010/0039378 A1 | 2/2010 | Yabe et al. |
| 2013/0207888 A1* | 8/2013 | Jin ................... G06F 3/011 345/156 |

FOREIGN PATENT DOCUMENTS

| | | |
|---|---|---|
| JP | 2000112651 A | 4/2000 |
| JP | 2004258766 A | 9/2004 |
| JP | 2008168133 A | 7/2008 |
| JP | 2010045658 A | 2/2010 |
| RU | 2012157287 A | 7/2014 |
| WO | WO2008010131 | 1/2008 |
| WO | 2009018161 A1 | 2/2009 |
| WO | 2009053901 A2 | 4/2009 |
| WO | WO2009122548 | 10/2009 |
| WO | 2011154873 A1 | 12/2011 |

OTHER PUBLICATIONS

Willmann et al., "Home Stroke Rehabilitation for the Upper Limbs", Proceedings of the 29th Annual International Conference of the IEEE EMBS, Aug. 23-26, 2007.

"Hamalainen", Interactive Video Mirrors for Sports Training, Proceedings of the Third Nordic Conference on Human-Computer Interaction, 2004, pp. 199-202.

* cited by examiner

METHOD AND APPARATUS FOR PRESENTING AN OPTION

TECHNICAL FIELD

The invention relates to a method and apparatus for presenting an option.

BACKGROUND OF THE INVENTION

A stroke rehabilitation system is a good tool for a stroke patient to do limb rehabilitation exercises.

The existing stroke rehabilitation system may usually include a host controller, a video camera, a display device and passive markers. The display device may display guidance for a limb rehabilitation exercise prescribed by doctors and/or therapists. The passive markers are worn on hands, elbows and shoulders of the stroke patient. When the stroke patient wearing the passive markers on hands, elbows and shoulders does limb rehabilitation exercises according to the guidance being displayed on the display device, the video camera may pick up images of the patient, and the host controller may perform image processing on the images picked up by the video camera to detect the markers worn by the patient, and present the detected markers as pointers on the display device. The host controller may calculate a trajectory performed by the patient, based on trajectories of the detected markers, and compare the calculated trajectory with a medical exercise template to give an evaluation of the training quality.

With the existing stroke rehabilitation system, user interaction needs to be carefully designed since the patient usually has an upper limb impairment on one side of the body. The use of an infrared remote controller in the existing stroke rehabilitation system is a feasible solution since the patient usually has an unimpaired upper limb on the other side of the body.

However, there are some inconvenience attached to this solution. The patient needs to hold the remote controller when control is needed, and the remote controller has to be placed somewhere when the patient is doing his training exercises. Usually the patient should keep a standing position or sits in a wheelchair in an open area without a desk or table by his side, so that the patient will find there is no place to put down the remote controller.

SUMMARY OF THE INVENTION

An object of the present invention is to provide a method and apparatus for presenting an option that enables user interaction to be performed without the controller.

In accordance with one aspect, an apparatus for presenting an option comprises: a calculation module adapted to calculate a movement range of an object and calculate an area of a display device, based on the movement range; and a presentation module adapted to present at least one option in the area of the display device.

In accordance with another aspect, a method of presenting an option comprises: calculating a movement range of an object; calculating an area of a display device, based on the movement range; and presenting at least one option in the area of the display device.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference Figures given below refer to the attached drawings.

DESCRIPTION OF THE DRAWINGS

The invention is explained in further detail, and by way of example, with reference to the accompanying drawings wherein.

Throughout the above drawings, like reference numerals will be understood to refer to like, similar or corresponding features or functions.

DETAILED DESCRIPTION OF EMBODIMENTS

Figure 1:
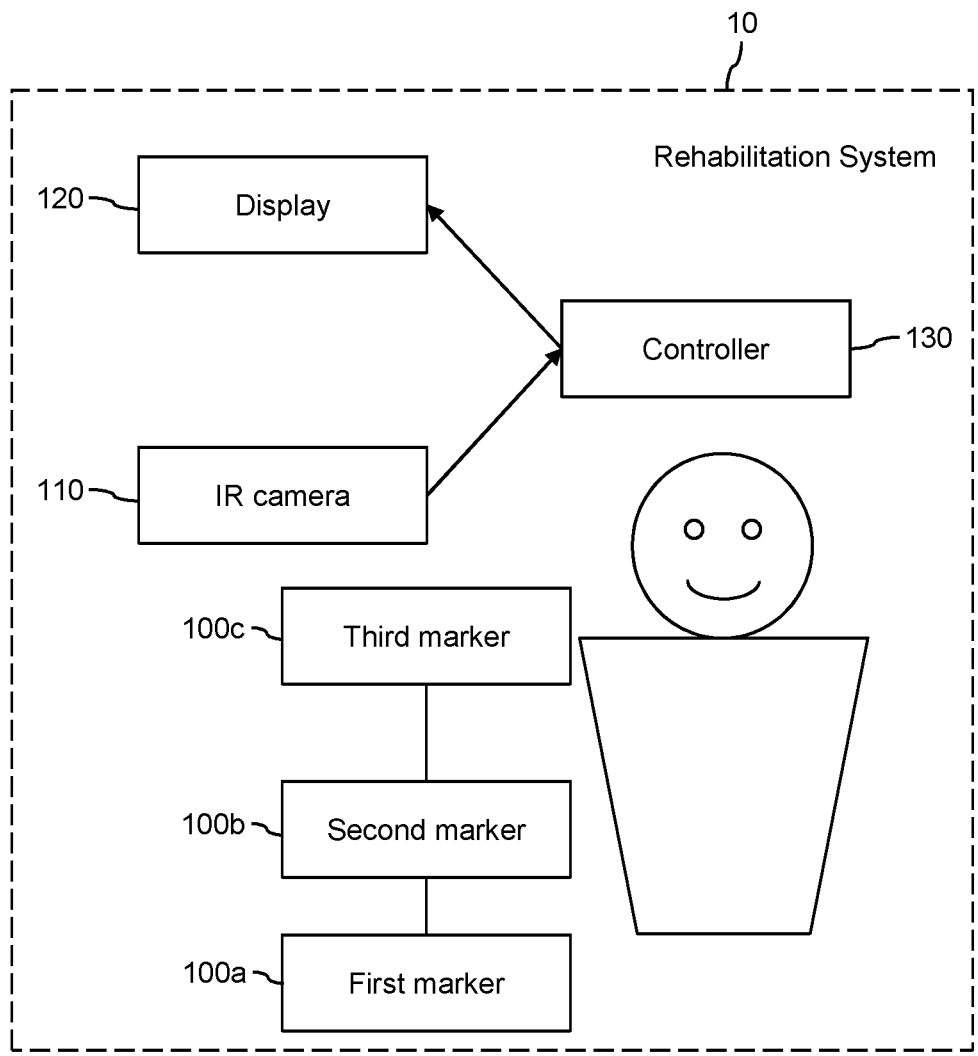
FIG. 1 is a schematic diagram illustrating a stroke rehabilitation system according to an embodiment of the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. Where an indefinite or definite article is used when referring to a singular noun, e.g. "a", "an", "the", this includes a plural of that noun unless specifically stated otherwise.

FIG. 1 is a schematic diagram illustrating a stroke rehabilitation system according to an embodiment of the invention. The stroke rehabilitation system 10 may include three retro-reflective markers 100a, 100b and 100c, an infrared camera 110, a display device 120 and a host controller 130.

The retro-reflective markers 100a-100c may be worn on a hand, elbow and shoulder of the patient, respectively. The marker 100a worn on the hand of the patient has a different shape from the marker 100b worn on the elbow of the patient and the marker 100c worn on the shoulder of the patient.

The infrared camera 110 may pick up images including the patient.

The display device 120 may display guidance about a limb rehabilitation exercise prescribed by doctors and/or therapists, and display at least one option in a specific area of the display device 120 as explained below in detail.

The host controller 130, which may include a processor, a RAM and a ROM, may perform image processing on the images picked up by the infrared camera 110 to obtain position information of the marker 100a worn on the hand of the patient, calculate a movement range of the marker 100a, based on the obtained position information, calculate an area of the display device 120, based on the calculated movement range, the area of the display device 120 being an area that displays the calculated movement range if the calculated movement range is displayed in the display device 120, and present at least one option (for example, menu item or button etc.) in the area of the display device 120 when the at least one option needs to be provided to the patient for selection. In another embodiment of the invention, the host controller 130 may further judge whether or not a pointer indicating the marker 100a on the display device 120 remains on one option of the at least one option for a predetermined period (for example 10 seconds), and determine that one option of the at least one option is selected by the patient when the judgment is affirmative.

Figure 2:
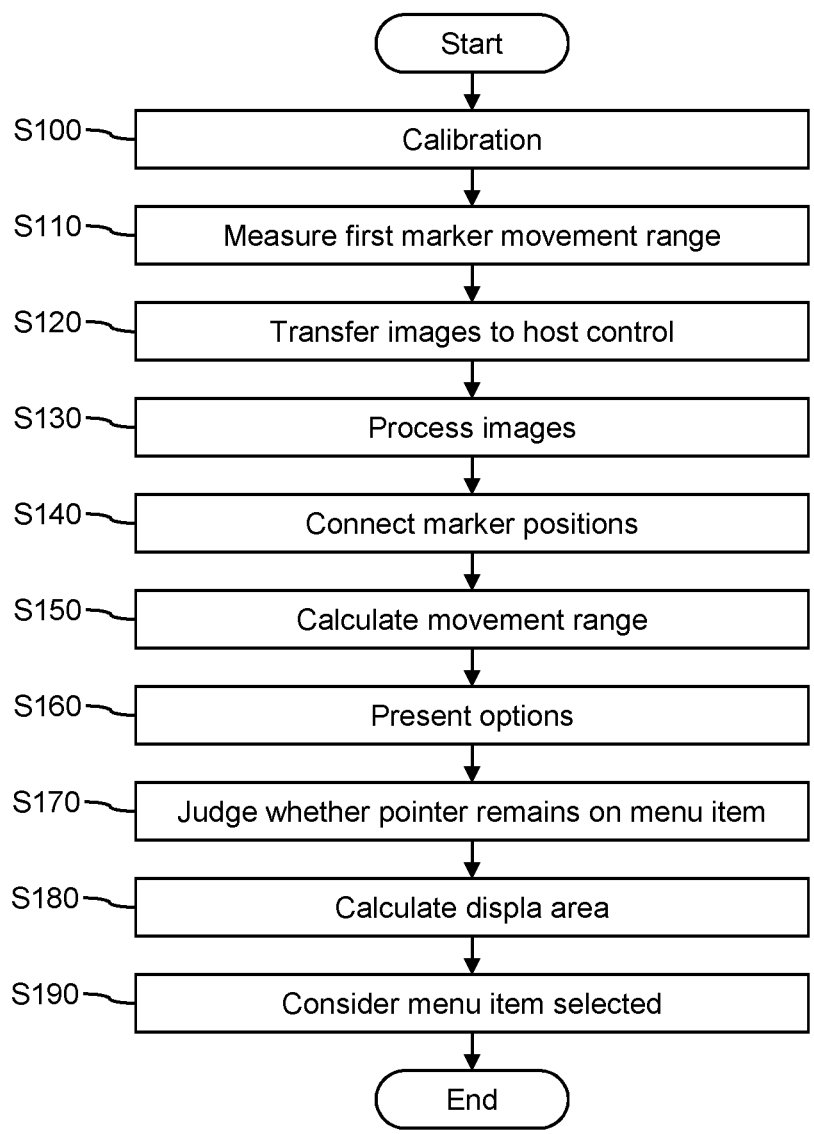
FIG. 2 illustrates a flowchart for a process of presenting an option according to an embodiment of the invention.

FIG. 2 illustrates a flowchart for a process of presenting an option according to an embodiment of the invention. A position calibration is performed to calibrate the patient's position such that it fits the training session (Step S100). The position of the marker 100a at the moment of completing calibration is recorded as the starting point.

After said position calibration, and until the system 10 is powered off, the camera 110 may continuously pick up images including the patient, and whenever the camera 110 picks up a new image, image processing on the new image is performed by the host controller 130 to obtain the present position of the marker 100a, and a pointer indicating the marker 100a is presented in a position on the display device 120 corresponding to the present position of the marker 100a.

A guide is presented in the display device 120 by the host controller 130, to ask the patient to move the marker 100a worn on the hand so as to measure the movement range that the marker 100a is able to cover (Step S110).

Images picked up by the infrared camera 110 during measurement of the movement range are transferred from the infra-red camera 110 to the host controller 130 (Step S120). Here, the fact that the marker 100a worn on the hand of the patient goes back to the starting point means that measurement of the movement range of the marker 100a is completed.

Image processing of each of the transferred images is performed by the host controller 130 to calculate the position of the marker 100a in each of said images, thus obtaining a plurality of positions of the marker 100a (Step S130).

A movement trajectory of the marker 100a is calculated by the host controller 130 by interconnecting the plurality of positions of the marker 100a (Step S140).

A region enclosed by the movement trajectory of the marker 100a is calculated by the host controller 130 as the movement range of the marker 100a (Step S150).

An area of the display device 120 is calculated by the host controller 130, based on the movement range of the marker 100a (Step S160). The area of the display device 120 is the area that displays the movement range of the marker 100a if the movement range of the marker 100a is displayed on the display device 120.

Figure 3A:
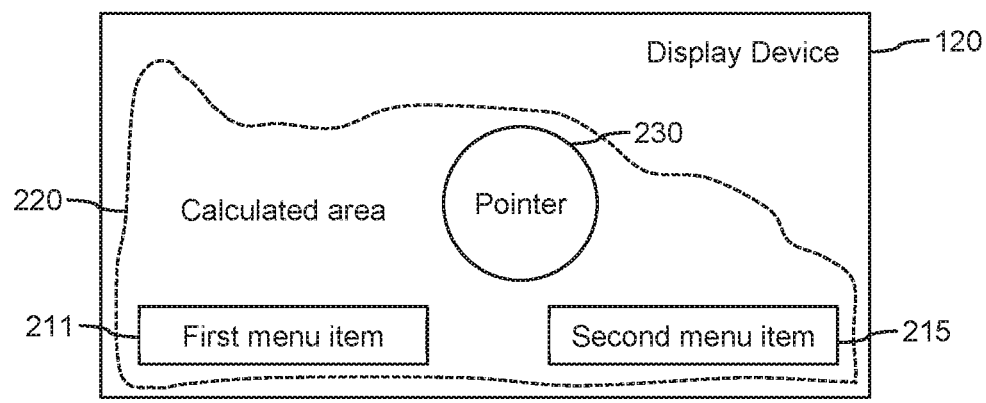
FIGS. 3A and 3B are examples of presenting an option in the display device.
Figure 3B:
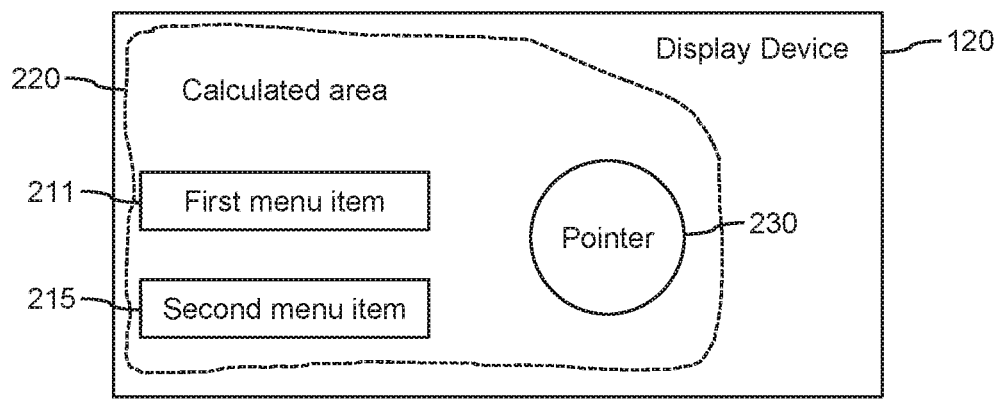

When an interaction is needed, at least one menu item indicating at least one option is presented in the calculated area of the display device 120 by the host controller 130 (Step S170). Here, it is preferred that the at least one menu item is presented at the bottom of the calculated area of the display device 120, so that it is easier for the patient to reach. FIGS. 3A-3B illustrate two examples of a first menu item 211 and a second menu item 215 presented at the bottom of the calculated area 220 of the display device 120. In addition, FIGS. 3A-3B also illustrate the pointer 230 indicating the marker 100a in the display device 120.

The host controller 130 judges whether or not the pointer indicating the marker 100a in the display device 120 remains on one menu of the at least one menu for a predefined period (e.g., 3 seconds) (Step S180).

If the judgment at Step S180 is affirmative, one menu of the at least one menu is considered as being selected by the patient and an action corresponding to the one menu of the at least one menu is conducted by the host controller 130 (Step S190).

The stroke rehabilitation system and the process for presenting an option according to the invention should not be limited to the embodiments mentioned above. It will be apparent to those skilled in the art that various aspects of the invention claimed may be practiced in other examples that depart from these specific details.

Those skilled in the art will understand that in the above embodiments of the invention, the movement trajectory of the marker 100a is calculated by using the Steps S110-S140, but the invention is not limited thereto. In an alternative embodiment of the invention, the movement trajectory of the marker 100a may also be calculated by using the following Steps S110'-S140'. At Step S110', a guide for measuring the movement range of the marker 100a is displayed on the display device 120 by the host controller 130, to ask the patient to move the marker 100a that he wears on his hand so that the pointer indicating the marker 100a on the display device 120 tries to reach specified points on the display device 120, for example four points indicating four corners of the display device 120 or eight points indicating four corners of the display device 120 and four midpoints of four sides of the display device 120. At Step S120', images picked up by the infrared camera 110 during measurement of the movement range are transferred to the host controller 130 from the camera 110. At Step S130', an image processing step is performed on the transferred images by the host controller 130 to obtain a plurality of positions of the marker 100a. At Step S135', multiple positions of the marker 100a are retrieved by the host controller 130 from the obtained plurality of positions of the marker 100a, wherein compared to other positions of the obtained plurality of positions of the marker 100a, each of the multiple positions of the marker 100a has a smaller distance with respect to one of the specified points. At Step S140', the movement trajectory of the marker 100a is calculated by the host controller 130 by interconnecting the multiple positions of the marker 100a.

Further, those skilled in the art will understand that in the above embodiments of the invention, the retro-reflective marker 100a worn on the hand of the patient is used as an object whose movement range is measured, but the invention is not limited thereto. In an alternative embodiment of the invention, the object whose movement range is measured may also be the marker 100b worn at the elbow of the patient, the marker 100c worn at the shoulder of the patient, a retro-reflective marker or non-reflective marker worn at any position of the upper limb of the patient, or in the palm of the hand of the patient.

Further, those skilled in the art will understand that in the above embodiments of the invention, the infrared camera 110 is used as an image pickup means, but the invention is not limited thereto. In an alternative embodiment of the invention, the image pickup means may also be a common optical camera.

Further, those skilled in the art will understand that in an alternative embodiment of the invention, the retro-reflective marker 100a used as the object whose movement range is measured may be replaced with a marker P equipped with a position detector such as a GPS or a combination of a magnetometer, gyroscope and accelerometer; the infrared camera 110 used as the image pickup means may be removed, and the Steps S120-S130 may be replaced with the following Step S125' to obtain position information of the marker P during measurement of the movement range of the marker P. At Step S125', positions of the marker P during measurement of the movement range of the marker P are received by the host controller 130 from the marker P.

In addition, those skilled in the art will understand that in the above embodiments of the invention, the option is indicated by the menu item on the display device 120, but the invention is not limited thereto. In an alternative embodiment of the invention, the option may also be indicated by a button on the display device 120.

Further, those skilled in the art will understand that in the above embodiments of the invention, the Steps S110-S160 are carried out to calculate the area of the display device 120 that displays the movement range of the object every time the system is powered on, but the invention is not limited thereto. In an alternative embodiment of the invention, the Steps S110-S160 may be carried out one time only when a predetermined period elapses, or the Steps S110-S160 may be carried out when the system 10 receives the instruction from the patient.

Further, those skilled in the art will understand that the process for presenting an option according to the invention may be applied not only to the stroke rehabilitation system but also to other systems.

Further, the operations executed by the host controller 130 in the process for presenting an option may be implemented by means of software, hardware or combination of software and hardware.

It should be noted that the above described embodiments are given for describing rather than limiting the invention, and it is to be understood that modifications and variations may be resorted to without departing from the spirit and scope of the invention, as those skilled in the art will readily understand. Such modifications and variations are considered to be within the scope of the invention and the appended claims. The protective scope of the invention is defined by the accompanying claims.

What is claimed is:

1. A stroke rehabilitation apparatus comprising one or more hardware processors configured by machine-readable instructions to:
    calculate a movement range of an object worn by a stroke rehabilitation patient, the movement range of the object corresponding to a stroke limited physical range of motion of the patient, the calculation of the movement range of the object comprising:
        detecting positions of the object in a series of images of the patient while the patient moves through the stroke limited physical range of motion, the one or more hardware processors configured to cause display of a guide on a display device for measuring the movement range of object, the guide configured to facilitate movement by the patient of the object such that physical positions of the object reach corresponding graphically specified points along different trajectories in the guide that define edges of the stroke limited physical range of motion; and
        determining the movement range based on detected positions of the object in the series of images;
    calculate an area representative of the stroke limited physical range of motion based on the calculated movement range for display on the display device; and
    present at least one user selectable option on the display device in the area representative of the stroke limited physical range of motion to facilitate selection of the at least one user selectable option by the patient by moving the object within the stroke limited physical range of motion to a physical position that corresponds to a graphical position of the at least one user selectable option displayed on the display device.

2. The apparatus of claim 1, wherein the one or more hardware processors are further configured to receive calibration position information of the object, the calibration position information indicating a starting position of the object in a first image of the series of images and calculate the movement range based on the received calibration position information of the object.

3. The apparatus of claim 2, wherein the one or more hardware processors are configured such that the graphical position of the at least one user selectable option corresponds to the starting position such that the at least one user selectable option is within easy reach of the patient in the stroke limited physical range of motion.

4. The apparatus of claim 1, wherein the series of images is picked up by a camera.

5. The apparatus of claim 2, wherein the one or more hardware processors are further configured to calculate a movement trajectory of the object based on the positions of the object in the series of images, and calculate the movement range based on the calculated movement trajectory of the object.

6. The apparatus of claim 1, wherein the object includes a marker worn on a hand of the patient.

7. The apparatus of claim 4, wherein the camera comprises an infrared camera.

8. The apparatus of claim 3, wherein the one or more hardware processors are further configured to:
    judge whether or not a pointer indicating a position of the object on the display device remains on the at least one user selectable option for a predefined period; and
    determine that the at least one user selectable option is selected responsive to the pointer remaining on the at least one user selectable option for the predefined period.

9. A stroke rehabilitation method comprising:
    calculating a movement range of an object worn by a stroke rehabilitation patient, the movement range of the object corresponding to a stroke limited physical range of motion of the patient, the calculation of the movement range of the object comprising:
        detecting positions of the object in a series of images of the patient while the patient moves through the stroke limited physical range of motion, the detecting positions comprising causing display of a guide on a display device for measuring the movement range of the object, the guide configured to facilitate movement by the patient of the object such that physical positions of the object reach corresponding specified points along different trajectories in the guide that define edges of the stroke limited physical range of motion; and
        determining the movement range based on detected positions of the object in the series of images;
    calculating an area representative of the stroke limited physical range of motion based on the calculated movement range for display on the display device; and
    presenting at least one user selectable option on the display device in the area representative of the stroke limited physical range of motion to facilitate selection of the at least one user selectable option by the patient by moving the object within the stroke limited physical range of motion of the patient to a physical position that corresponds to a graphical position of the at least one user selectable option displayed on the display device.

10. The method of claim 9, wherein the method further comprises a step of receiving calibration position information of the object, the calibration position information indicating a starting position of the object in a first image of the series of images; and the step of calculating a movement range of an object further comprises calculating the movement range based on the received calibration position information of the object.

11. The method of claim 10, wherein the graphical position of the at least one user selectable option corresponds to the starting position such that the at least one user selectable option is within easy reach of the patient in the stroke limited physical range of motion.

12. The method of claim 11, wherein the method further comprises a step of picking up the series of images including the calibration position information of the object with a camera.

13. The method of claim 10, wherein the method further comprises:

calculating a movement trajectory of the object based on the positions of the object in the series of images; and
calculating the movement range based on the calculated movement trajectory of the object.

14. The method of claim 11, further comprising:

judging whether or not a pointer indicating a position of the object displayed on the display device remains on the at least one user selectable option for a predefined period; and
determining that the at least one user selectable option is selected responsive to the pointer remaining on the at least one user selectable option for the predefined period.

15. A non-transitory machine-readable medium storing machine-readable instructions, causing a machine to perform the method of claim 9 when executed by the machine.

16. The apparatus of claim 1, wherein the one or more hardware processors are configured such that the graphically specified points along different trajectories in the guide that define edges of the stroke limited physical range of motion correspond to corners of the display device and mid-points of sides of the display device.

17. The method of claim 9, wherein the graphically specified points along different trajectories in the guide that define edges of the stroke limited physical range of motion correspond to corners of the display device and mid-points of sides of the display device.

* * * * *